United States Patent [19]

Krohn et al.

[11] 4,036,624
[45] July 19, 1977

[54] HEAT TREATMENT METHOD FOR MAKING PHOTOCHROMIC GRADIENT LENSES

[75] Inventors: David A. Krohn, Southbridge, Mass.; Emil W. Deeg, Woodstock, Conn.

[73] Assignee: American Optical Corporation, Southbridge, Mass.

[21] Appl. No.: 668,175

[22] Filed: Mar. 18, 1976

Related U.S. Application Data

[62] Division of Ser. No. 624,688, Oct. 22, 1975.

[51] Int. Cl.² .................. C03C 15/00; C03B 31/00
[52] U.S. Cl. ............................ 65/30 R; 65/33; 65/111; 65/115; 65/119; 65/120; 65/DIG. 2; 106/47 Q; 106/52; 106/54; 106/DIG. 6
[58] Field of Search ............. 65/30 R, 33, DIG. 2, 65/111, 115, 119, 120; 106/47 Q, 54, DIG. 6, 52

[56] References Cited

U.S. PATENT DOCUMENTS

| | | | |
|---|---|---|---|
| 2,292,684 | 6/1942 | Blau | 65/33 |
| 2,515,940 | 7/1950 | Stookey | 65/33 X |
| 2,752,506 | 6/1956 | Fitzgerald et al. | 65/DIG. 2 |
| 2,770,922 | 11/1956 | Fitzgerald et al. | 65/DIG. 2 |
| 2,825,634 | 3/1958 | Rindone | 65/DIG. 2 |
| 3,419,370 | 12/1968 | Cramer et al. | 65/30 E |
| 3,795,523 | 3/1974 | Moriya et al. | 65/DIG. 2 |
| 3,833,511 | 9/1974 | Yamashith et al. | 65/DIG. 2 |
| 3,834,912 | 9/1974 | Gliemeroth | 65/DIG. 2 |
| 3,920,463 | 11/1975 | Simms | 65/30 R X |
| 3,938,977 | 2/1976 | Gliemeruth | 65/33 X |

FOREIGN PATENT DOCUMENTS

| | | | |
|---|---|---|---|
| 739,404 | 7/1966 | Canada | 65/DIG. 2 |

Primary Examiner—S. Leon Bashore
Assistant Examiner—Frank W. Miga
Attorney, Agent, or Firm—William C. Nealon; H. R. Berkenstock, Jr.

[57] ABSTRACT

The invention achieves local variation, or a continuous gradation, in photochromic or phototropic properties across the face of glass lenses and lens blanks, especially those of ophthalmic quality. The lenses and lens blanks contain all those ingredients required to produce photochromic or phototropic behavior. They are exposed to a locally variable temperature field or environment, in such manner as to, in at least one portion of the lens or lens blank cause the temperature therein to exceed the strain point but not the softening point of the glass. In other portions of the lens or lens blank the temperature is below the strain point, thus causing development of phototropic or photochromic behavior only in those portions of the lens or lens blank exposed to the temperatures above the strain point.

5 Claims, 3 Drawing Figures

SCHEMATIC OF GRADIENT FURNACE

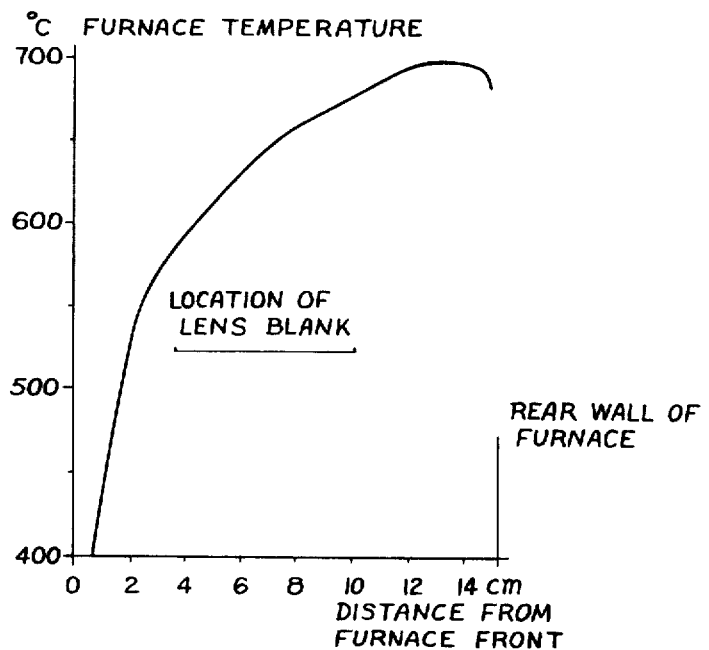
Fig. 2 TEMPERATURE PROFILE IN FURNACE
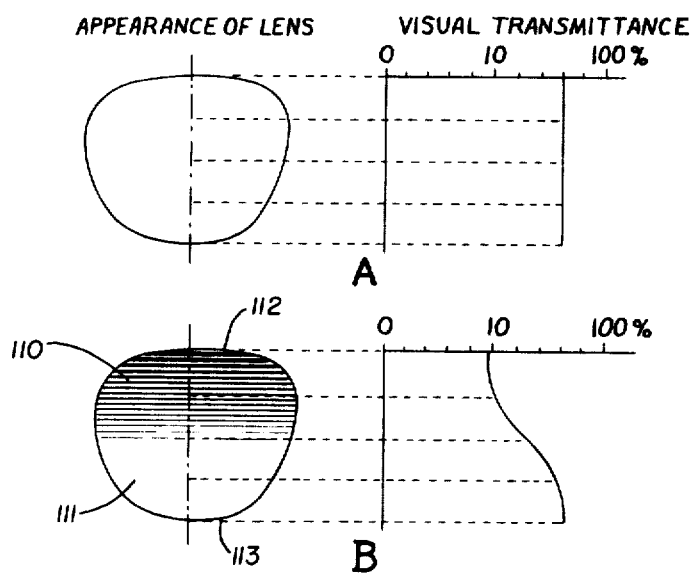
SCHEMATIC REPRESENTATION OF APPEARANCE OF A PLANO LENS AND CORRESPONDING VISUAL TRANSMITTANCE ALONG CENTER LINE OF THE SAME LENS BEFORE (A) AND AFTER (B) EXPOSURE TO SUNLIGHT
Fig. 3

HEAT TREATMENT METHOD FOR MAKING PHOTOCHROMIC GRADIENT LENSES

This is a division, of application Ser. No. 624,688 filed Oct. 22, 1975.

FIELD OF THE INVENTION

This invention relates to phototropic or photochromic ophthalmic lenses and to a process of making such lenses. More specifically, it relates to lenses with continuous gradations in phototropic behavior and to a process of making such lenses.

BACKGROUND DISCUSSION OF THE PRIOR ART

Ophthalmic lenses serve basically three purposes:
1. correction of vision defects;
2. protection against mechanical hazards to the eye;
3. protection against radiation.

The first purpose is accomplished by providing transparent articles in the form of lenses with well defined refractive power. The second purpose is accomplished by either (1) using impact resistant materials for lens construction or (2) judicious treatment of glass lenses to provide additional strength. Such methods include, for example, the well known and widely practiced procedure of heating lenses above the strain point and rapidly quenching them in either an air stream or a liquid. An example of the latter process is described in U.S. Pat. No. 3,768,992. A second method of increasing strength is to provide for a compression envelope over the surface of the lens. Such methods are described, for example, in U.S. Pat. No. 3,790,260 and in pending patent application file number AO-2366 Ser. No. 157,481, filed June 28, 1971, owned by the assignee of this application.

Protection against such radiation as ultraviolet light, intense visible light or the infrared can be achieved by adding colorants to the glass batch. Examples for such colorants can be found in the book COLOURED GLASSES by W. A. Weyl, Soc. Glass Technol., Sheffield, England, 1967. In the case of ophthalmic lenses made from high polymers, colorants can be added to the material itself as has been done in some commercially available sunglasses for many years. It is also possible to tint colorless plastic lenses by exposing them to a surface dyeing process. An example of such a lenses is available in commerce under the trade neme "Tintolite" sold by American Optical Corporation of Southbridge, Massachusetts. Clear glass lenses can also be tinted by exposing them to a so-called "staining process" of which many examples can be found in the above mentioned book by W. A. Weyl. A specific example of such a staining process applied to glass lenses is described in the pending patent application file number AO-2958 Ser. No. 610,608 filed Sept. 5, 1975 owned by the assignee of this application. A wide variety of permanently colored lenses useful for ophthalmic application are available in commerce and sold under such trade names as "Truecolor", "Cruxite", "Cosmetan", "Calobar", all manufactured by Americal Optical Corporation.

Permanently colored or dyed ophthalmic lenses have a disadvantage of retaining low transmission of light when the wearer of such lenses is exposed to low levels of illumination i.e., is in a more or less dark environment. A typical example of such an environment would be sunglasses worn during nighttime driving which can, of course, be hazardous. This disadvantage can be overcome, to a certain extent, by the many varieties of phototropic or photochromic glass or plastic lenses available in commerce today. Phototropic ophthalmic lenses have been described for example in U.S. Pat. No. 3,197,296. The lenses described therein in essence are transparent to visible radiation but will darken upon exposure to actinic radiation, having a transmission to visible radiation of about 45% of the original transmissivity. The reduction in transmissivity of such lenses is reversible with a half-fading time of not more than five minutes. Some other prior art of which we are aware includes: the ophthalmic lenses described in U.S. Pat. No. 3,197,296 utilizing a specific glass composition falling within the following ranges, on a weight percent basis: 48 to 58 $SiO_2$, 6 to 10 $Al_2O_3$, 15 to 22 $B_2O_3$, 0.8 to 2.0 $Na_2O$, 2.4 to 3.1 $Li_2O$, 0 to 4 $K_2O$, the total $Li_2O$ plus $Na_2O$ plus $K_2O$ being 3.2 to 7.2, 4.5 to 5.3 PbO, 3 to 9 BaO, 0 to 7.2 $ZrO_2$, 0.15 to 0.6 Ag, 0.01 to 0.02 CuO, 0.3 to 1.2 Cl, 0 to 1.0 Br, 0 to 1.0 I, and 0 to 1,2 F; numerous phototropic or photochromic glasses described for example in U.S. Pat. Nos. 3,208,860; 3,548,060; 3,594,198; 3,617,316; 3,703,388; 3,765,913; 3,795,523; 3,833,511; 3,834,912; British Pat. No. 1,275,019; German Pat. No. 2,230,506; and German Auslegeschrift No. 2,256,775.

In addition to the above mentioned patents on photochromic glasses, all containing silver halide particles uniformly dispersed throughout the volume of an article made from them, we know Chance-Pilkington Optical Glass Company, England, is marketing a phototropic phospho-silicate glass under the trade name "Reactolite". No reference describing compositional details and methods of making this glass has been found by us in the patent literature to date.

Photochromic glasses sensitized by silver halides are also know to use as described in general in the following articles:

W. H. Armistead and S. D. Stookey: "Photochromic Silicate Glasses Sensitized by Silver Halides", SCIENCE, Vol. 144 (1964) pp. 150–154;

G. Gliemeroth and K. H. Mader: "Phototropic Glass", Angew. Chem. Internat. Edit., Vol. 9 (1970) pp. 434–445;

A. V. Dotsenko et al.: "A Study of the Effect of Copper Ions on the Relaxation Properties of Photochromic Glasses", Sov. J. Opt. Technol., Vol. 41 (1974) pp.395–397;

R. J. Araujo: "Photochromic Glasses", Chapter 8 of the book PHOTOCHROMISM edited by G. H. Brown, Willey Interscience, New York (1971) pp. 667–686;

H. Bach and G. Gliemeroth: "Phase Separation in Phototropic Silver-Halide-Containing Glasses", J. Amer. Cer. Soc. (1971) pp. 43–44.

All these prior art glasses seem to have in common that:

1. the ingredients producing the photochromic or phototropic behavior are silver halide particles uniformly dispersed in a glass matrix; and 2. articles made from these glasses must be exposed to a well defined heat treatment to develop photochromic or phototropic behavior.

The glasses also appear to differ from each other in the compositions of the base glasses which serve as carriers for the phototropic or photochromic centers. In general terms a phototropic glass article is described in U.S. Pat. No. 3,208,860. This patent discloses a phototropic article comprising a silicate glass body having in at least a portion thereof microcrystals of at least one silver halide selected from the group consisting of silver chloride, silver bromide, and silver iodide, the concentration of said crystals in said portion being at least 0.005% by volume.

In addition to glass articles containing silver halide crystals dispersed throughout their entire volume, we know it has also been proposed to prepare photochromic glass lenses by diffusing silver ions into a surface layer of a base glass containing quantities of halide ions and subsequently exposing these articles to a specific heat treatment. Such an article and the process of making it is described for example in U.S. Pat. No. 3,419,370.

It also has been proposed to prepare photochromic articles by applying phototropic coatings on substrates such as glass or plastic. Such articles are described for example in U.S. Pat. No. 3,875,321 and in a paper by G. Gliemeroth at the 75th Annual Meeting of the American Ceramic Society, Cincinnati, Ohio, May 2, 1973, which was subsequently published in the Journal of the American Ceramic Society (1974) pages 332-335 under the title "Reversible Optical Density Changes in Composite Layers".

Photochromic or phototropic lenses of the kind described above overcome to a certain extent the above-noted disadvantages of permanently tinted lenses. Because of the reversibility of the photochromic effect they assume a low transmissivity if exposed to ultraviolet or blue light but resume high transmissivity in an environment where low illumination levels of activating radiation prevail. Glass lenses have the known advantage over plastic photochromic lenses of more scratch resistance and they do not appear to lose photochromic properties during extended wear due to the degradation of active ingredients.

All photochromic or phototropic lenses presently known to us have the disadvantage that recovery of high transmissivity takes several minutes. This has been noticed with discomfort and dislike by wearers under such conditions as driving an automobile where low levels of illumination exist inside the car and high levels of illumination outside of the vehicle. It obviously is desirable to reduce the light intensity to a driver's eyes while he or she is observing road and traffic conditions, but simultaneously he or she must be permitted to observe clearly information presented by instruments on the vehicle dashboard where a low level of illumination normally exists. Indeed, it can be dangerous to prevent this. Other instances which illustrate the problem are found in occupations where sudden changes in the level of illumination from bright to dim occur either (1) by rapid changes in the intensity of the light source of (2) by movement of the wearer of the spectacles from an area of high illumination to a darker environment. Similar disadvantages have been observed by wearers of permanently colored lenses.

Some of the above disadvantages have been overcome by use of eyeglasses with a continuous variation of transmissivity from low at the top of the lens to high over the lower portion of the lens. Lenses with such a permanent gradient in degree of color or tint now are available in commerce. We believe the lenses are being prepared by differentially dyeing plastic lenses or by applying a gradiated colored coating over glass lenses by vacuum deposition of absorbing materials. With plastic lenses the color gradient can be achieved by continuously or progressively changing the concentration of dye absorbed by the lens. For example, a high concentration prevails at the top and a low concentration at the bottom of a lens.

In U.S. Pat. No. 3,419,370 we find the statement on representation that a gradient in photochromic behavior across a glass body is attainable by varying the time and/or temperature at which different portions of the glass body are exposed to an ion exchange medium. According to this patent the ion exchange bath contains, in all instances, silver ions (see Table 2 of the patent). The gradient in photochromic properties is achieved by causing or allowing different concentrations of silver ions to diffuse into the glass. The patent teaches, in our opinion, that the glasses described cannot be made photochromic or phototropic without having been exposed to the diffusion process in the silver containing ion exchange bath prior to the heat treatment required to develop phototropic or photochromic behavior. The glasses do not contain any silver ions in the base composition. The patent does not make any specific reference or teaching that we can find of a photochromic gradient over ophthalmic lenses.

In our opinion, the state of the art of making ophthalmic lenses uniformly phototropic or photochromic throughout their entire volume can be summarized as follows:

1. Glasses of the types listed in Table I hereafter are melted following procedures known to those skilled in the art of glass making.

2. Lens blanks are made of these glasses by known methods such as pressing or casting.

3. These articles are exposed to a controlled heat treatment to develop silver halide particles of linear dimensions $d$ falling essentially within the range $5 < d < 50$ nm. The lower limit is required to produce photochromic or phototropic behavior, the upper limit to avoid light scattering unacceptable in ophthalmic products. The total concentration of these silver halide particles which are dispersed uniformly throughout the glass article should be at least 0.005 vol. %.

In our opinion, the state of the art of making glass articles with a gradient in photochromic or phototropic behavior as deduced from U.S. Pat. No. 3,419,370 can be summarized as follows:

1. A base glass having a composition in essence in the general system Alk. Oxide — $Al_2O_3$ — $B_2O_3$ — $SiO_2$, with addition of halides to the batch, is melted under conditions that allow retention of a sufficient quantity of halides.

2. Lens blanks are made from the glasses by known methods such as pressing or casting.

3. Finished lenses are made from the blanks by grinding and polishing.

4. The finished lenses are exposed to a source of silver ions at elevated temperature in such a fashion that in those parts of the lens where a high degree of phototropic of photochromic behavior is desired the silver concentration is higher than in those parts where a low degree of phototropic or photochromic behavior is desired.

5. The thus treated lenses are exposed to a carefully controlled heat treatment to grow silver halide crystals to a size required for photochromic or phototropic behavior, but not exceeding linear dimensions of 50 nm to avoid the light scattering unacceptable in ophthalmic lenses.

SUMMARY OF OUR INVENTION

Ophthalmic lens pressings which do not exhibit phototropic or photochromic behavior are made from glasses containing all necessary ingredients to produce such phototropic or photochromic behavior. Such glass is hereafter sometimes referred to as "unnucleated" photochromic glass. This expression is used herein for reasons of simplicity. We are aware that the submicroscopic nuclei required to develop silver halide particles already exist in the non-phototropic state of the glass. In other words, the nuclei are so small they cannot be seen with a light microscope since they do not apparently reflect light. Numerically speaking, they have a maximum linear dimension which is less than 5 nm. In fact, as will be recognized by one skilled in the art, these particles are too small to interact with light in the visible spectrum. We have not measured them but choose the 5 nm number as one having a meaning to one in this art. The pressings are not exposed to the heat treatment required to develop photochromic or phototropic behavior. The pressings are transferred or made into lens blanks, the blanks are given a gradient in their phototropic or photochromic behavior by exposing them to a temperature field. The exposure is such that one portion of the blank is heated to a temperature above the strain point but below the softening point of the glass while a distant part of the blank is maintained at a temperature below the strain point.

It has also been found that ophthalmic lenses made from unnucleated glass pressings which have not been exposed to the specific heat treatment required to develop photochromic or phototropic behavior, can be made into semi-finished or finished lenses having a gradient in their phototropic or photochromic behavior across the face.

It also has been found that so-called "one-piece multifocal" or "raised ledge multifocal" glass lenses and progressive power glass lenses with desirable properties can be made with a gradient in the phototropic or photochromic behavior since such lens designs are particularly suited to the practice of the present invention that the portion of the lens used for distant vision can be made phototropic or photochromic whereas the portion of the lens used for near vision will not have such properties. To achieve such a gradient in photochromic or phototropic behavior in raised ledge multifocal lenses lens blanks suitable for subsequent generating and polishing are exposed to a temperature gradient as described, alternatively, finished lenses can be exposed to a corresponding temperature gradient.

The present invention is applicable to all glass lens blanks or lenses. The lenses and blanks contain all those ingredients required for producing photochromic or phototropic behavior substantially uniformly dispersed therethrough but having silver halide in an unnucleated state, that is, particles thereof are of less size than that required to produce photochromic or phototropic behavior. It is preferred to use glasses with a coefficient of expansion below $60.10^{-7}$ per degree C to reduce thermal fracture of lenses and blanks during treatment in the temperature gradient field. However, the invention is not limited to such glasses.

DESCRIPTION OF THE PREFERRED EMBODIMENTS

To better understand articles and processes according to the instant invention the following considerations appear to be helpful.

The transmission T of a glass lens can be described by the expression $$T = \exp(-K \cdot Z_o)$$

where $K$ = coefficient of extinction and $Z_o$ = thickness of the lens at the location of measurement measured parallel to the direction of the incident beam of light.

K is a function of the wavelength of light and for a given wavelength is normally a material constant characteristic for the glass the lens is made of. The lens thickness $Z_o$ is a variable of the two space coordinates $x$ and $y$ in a plane normal to the optical axis of the lens. The degree of variation of $Z_o$ depends on the Rx values of the lens. For negative lenses $Z_o$ is larger at the edge than at the center, for positive lenses $Z_o$ is larger at the center than at the edge. This results in a local variation of the light transmission T. Strong negative lenses e.g. made of a colored glass appear to be darker at the edge than at the center. The degree of variation of T in this case is entirely determined by the shape of the lens required to achieve a specific prescription. In general, $Z_o = Z_o(x, y)$.

In case of a photochromic or phototropic lens the extinction coefficient K is time dependent and dependent upon wavelength and intensity of the activating radiation. For reasons of simplicity a monochromatic activating radiation of constant intensity shall be assumed. If $t$ is the duration of exposure to such activating radiation $K_1$ increases with $t$ or $$\frac{dK_1}{dt} > 0, \text{ whereby } K_1(t) \text{ reaches a constant value after approximately } \tfrac{1}{2} \text{ hour depending upon the glass studied and the precision of the measurement.}$$

Therefore eg. (1) becomes
$$T_1(t) = e^{-K_1(t) \cdot Z_0}$$

with $$\frac{dT_1}{dt} = -Z \cdot \frac{dK_1}{dt} \cdot e^{-K_1(t) \cdot Z_0} < 0$$

i.e. the transmission decreases with increasing exposure time. The saturation value of $T_1(t)$ reached after approximately 30 minutes can be between 30 and 45% depending upon the nature of the glass and the thickness of the lens. The original transmission before exposing the lens to activating radiation is normally above 90%.

After removing the activating radiation the lens gradually regains its original transmission value. This process can be described by introducing a second time dependent extinction coefficient $K_2(t)$ with $$\frac{dK_2}{dt} < 0.$$

Correspondingly the change in transmission $T_2$ with time t is $$\frac{dT_2}{dt} = Z_0 \cdot \left|\frac{dK_2}{dt}\right| \cdot e^{-K_2(t) \cdot Z_0} > 0.$$

In general terms the transmission T of a photochromic lens therefore can be described by $$T(t, x, y) = \exp(-K(t) \cdot Z_o(x, y))$$

with $K(t) = K_1(t)$ during exposure to activating radiation, and $K(t) = K_2(t)$ after removing the activating radiation;

$Z_o(x, y)$ is determined by the prescription values required to provide for correction of vision in each individual case.

To achieve a gradient in phototropic or photochromic behavior across the face of a lens the coefficient of extinction K must be a function of the two spaced coordinates x and y in addition to its dependence on time:

$$K = K(t, x, y).$$

The corresponding expression for light transmission through the lens at a point $\{x, y\}$ is $$T(t, x, y) = \exp(-K(t, x, y) \cdot Z_o(x, y)).$$

which for plano lenses can be simplified to $$T(t, x, y) = \exp(-K(t, x, y) \cdot Z_o)$$

with $Z_o$ = constant.

To achieve such a space dependent coefficient of extinction prior art U.S. Pat. No. 3,419,370 teaches utilization of a corresponding variation in the concentration of silver required to form silver halide crystals providing for phototropic or photochromic behavior. As indicated above in the section "Background Discussion of the Prior Art" such a process is only applicable to finished lenses. It is furthermore very difficult to control and requires an additional step; namely, the introduction of silver ions through a diffusion process. It furthermore requires use of a glass melted under special conditions to retain sufficient halogen to form silver halide particles.

Prior workers have failed to recognize or appreciate that all potentially phototropic or photochromic glass articles utilizing silver halide particles to achieve phototropic or photochromic behavior can be used to prepare articles with a gradient in that behavior. To produce an extinction coefficient $$K(t, x, y)$$

through local variation of the silver concentration the prior workers have used a specially melted glass and subsequent exposure to a silver diffusion process. In contrast we provide a locally variable extinction coefficient through well controlled development of a proper size distribution of silver halide particles in unnucleated glass initially containing all of the necessary silver and halogen atoms uniformly distributed throughout the entire volume of the glass article. Such a desirable size distribution of silver halide particles is achieved by carefully controlled exposure to a locally variable temperature field. This can be done with either lens blanks or finished lenses. Such lenses are made of glass which can be described as "potentially photochromic or phototropic glass".

While practicing the present invention, care must be taken to avoid thermal fracture of the lenses or lens blanks when they are exposed to a locally variable temperature field. Glasses with a low coefficient of thermal expansion, such as certain borosilicates, are better suited for this application than glasses with a high coefficient of thermal expansion, such as the phosphosilicates. Boro-silicate glasses have coefficients of thermal expansion in the range approximately 30 to $60 \times 10^{-7}/°C$. To the best of our knowledge other glasses used commercially as a carrier or matrix for phototropic or photochromic centers have coefficients of thermal expansion of $90 \times 10^{-7}/°C$ and above. The higher the coefficient of thermal expansion, the higher the thermal stresses existing in the glass article when they are exposed to a temperature gradient.

BRIEF DESCRIPTION OF THE DRAWINGS

FIG. 2 is the temperature profile between points A and B in such a furnace which was used to produce a photochromic gradient in unnucleated potentially phototropic glass of composition A of Table No. 1.

FIG. 3 schematically illustrates the appearance of a plano lens and the corresponding visual transmittance across the face of such a lens before (a) and after (b) exposure to activating radiation (sunlight) for approximately 30 minutes.

EXAMPLE NO. 1

Figure 1:
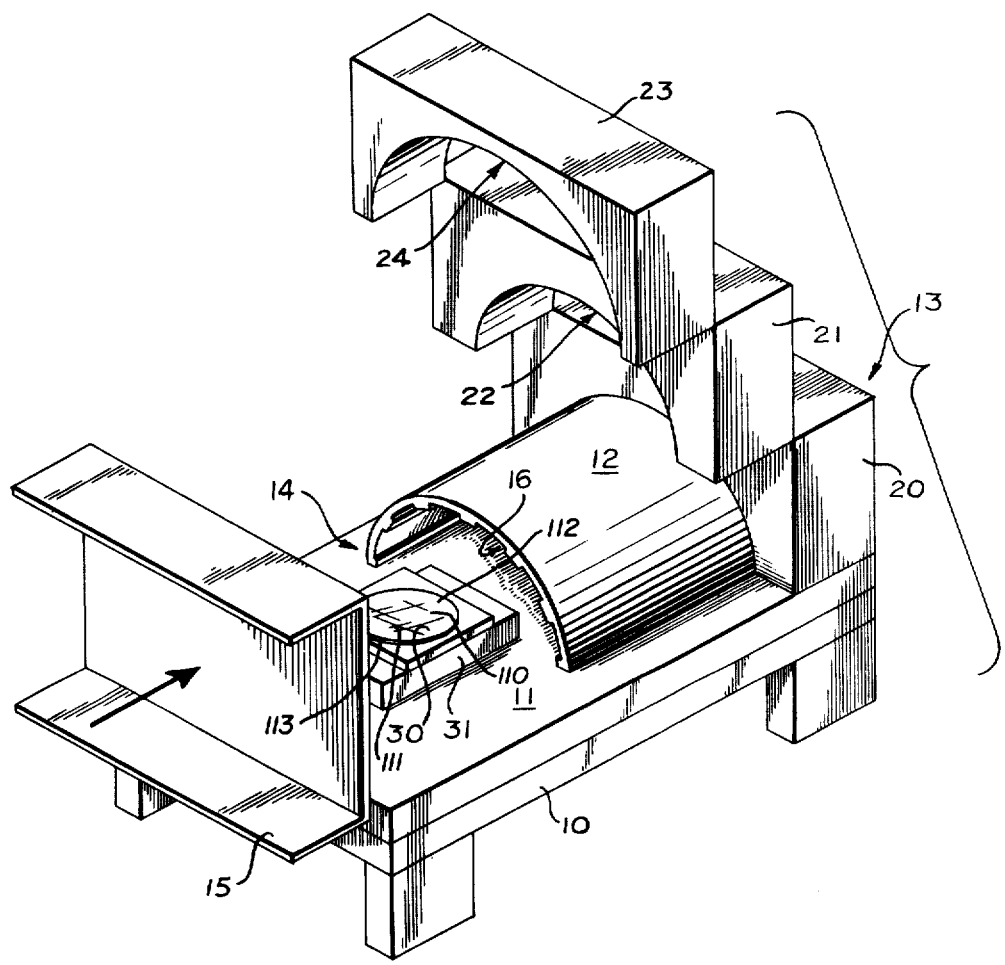
FIG. 1 is a schematic of the laboratory furnace used for exposing lens blanks to the temperature gradient required for practicing the invention.

A disk-like glass pressing or lens blank consisting of an unnucleated photochromic glass according to composition A of Table I, having a thickness of 8.5 mm and a diameter of 65 mm, was placed in a furnace according to FIG. 1 and exposed to a temperature gradient according to FIG. 2 for approximately 90 minutes. The lens blank was removed from the furnace, placed between preheated insulating asbestos cloth blankets and allowed to cool to room temperature. The blank exhibited a photochromic gradient upon exposure to sunlight. It returned to its initial uniform state of high transmissivity after being stored for approximately 2 hours at room temperature out of ultraviolet radiation (i.e. out of the sun's light). From this blank a plano lens of 2.2 mm center thickness was generated and polished on both sides according to normal procedures. It was then edged to fit the left eye of a metal frame sold under the trademark "Quasar" by American Optical Corporation. A second plano lens was prepared following the same procedures to fit the right eye of the same frame. Both finished lenses were then strengthened by an ion exchange process in binary sodium-potassium nitrate bath at 400° C following procedures routinely applied in the industry. The lenses were then impact tested following FDA recommendations and mounted in the frame. The pair of spectacles thus prepared had lenses which exhibited the desired characteristics of variable photochromicity from top to bottom.

EXAMPLE NO. 2

A lens blank as described in Example No. 1 was exposed to the same preparation treatment and subsequently ground and polished to a −5.62 diopter unfinished lens. It was then edged to fit the left eye of the same type of frame. A second lens was made following the same procedure except it was ground and polished to a −4.75 diopter unfinished lens and then edged for insertion into the right eye of the same frame. Both lenses were straightened and impact tested and mounted in the frame. This pair of prescription spectacles was actually worn and the advantages described above in the Summary of Our Invention were actually observed.

EXAMPLE NO. 3

Six blanks according to Example No. 1 were treated subsequently in the laboratory furnace of FIG. 1. They were ground and polished on commercial production equipment used for producing raised ledge bifocal lenses. The Rx values of these lenses were 0 diopters for the distant vision portion and +1 diopter for the near vision portion, a prescription frequently used for early presbyopes. These unfinished lenses showed the desirable gradient in phototropic behavior as described in the Summary of Our Invention.

EXAMPLE NO. 4

A single vision plano lens having 3.4 mm center thickness was generated and polished from a blank consisting of a potentially photochromic glass having the composition A of Table I. This lens was edged to 48 mm FV7 size and shape, one which is frequently used in glazing safety frames. This plano lens was then exposed to the heat treatment described above with reference to Example No. 1. It was subsequently exposed to an air quench strengthening process regularly used in the safety eyewear industry, tested for impact resistance according to ANSI Z-87, and mounted in a plastic safety frame. A second lens was prepared following the same procedures and mounted in the other eye of the same frame. This pair of safety spectacles displayed the advantages described above in the Summary of Our Invention.

Table I

Compositions in wt % of Unnucleated Glasses Useable According to This Invention

|  | A | B | C | D | E |
|---|---|---|---|---|---|
| $SiO_2$ | 53.0 | 21.4 | 58.8 | 57.3 | 0.0 |
| $Al_2O_3$ | 10.5 | 37.7 | 22.9 | 9.1 | 8.3 |
| $ZrO_2$ | 2.0 | 0.0 | 0.0 | 0.0 | 1.3 |
| $Li_2O$ | 2.1 | 0.0 | 4.5 | 0.0 | 0.0 |
| BaO | 6.0 | 5.5 | 0.0 | 0.0 | 3.3 |
| SrO | 0.2 | 0.0 | 0.0 | 0.0 | 0.0 |
| $Na_2O$ | 0.6 | 3.8 | 1.5 | 6.5 | 16.2 |
| NaF | 1.0 | 1.0 | 4.7 | 3.1 | 0.0 |
| NaCl | 1.0 | 1.0 | 1.8 | 2.6 | 1.0 |
| $Ag_2O$ | 0.4 | 0.5 | 0.4 | 0.5 | 0.6 |
| PbO | 5.1 | 0.0 | 0.0 | 1.0 | 0.0 |
| CuO | 0.1 | 0.1 | 0.02 | 0.02 | 0.02 |
| $P_2O_5$ | 0.0 | 15.6 | 0.0 | 0.0 | 7.5 |
| $B_2O_3$ | 18.0 | 4.8 | 2.5 | 18.6 | 61.8 |
| $K_2O$ | 0.0 | 8.6 | 0.0 | 0.0 | 0.0 |
| NaBr | 0.0 | 0.0 | 0.8 | 1.3 | 0.0 |
| MgO | 0.0 | 0.0 | 2.1 | 0.0 | 0.0 |

Colorants well known to those skilled in the art may be included. Such colorants are substantially neutral or non-reactive as far as the other glass constituents are concerned. Exemplary ones include: transition metal oxides including such as $Fe_2O_3$, $Cr_2O_3$, CoO; certain rare earth oxides such as $Nd_2O_3$, $Pr_2O_3$.

EXAMPLE NO. 5

Glasses B, C, D, and E, may also be used to practice our invention. While we have not actually fabricated lenses in the laboratory to practice the present invention, the use of these glasses is within the scope of our invention. To use the glasses, one prepares lenses, or lens blanks, as described in Examples 1 through 4 above. The strain point and softening point of the respective glasses are noted and furnace insulation is placed to allow an appropriate temperature gradient along the length of the furnace. As noted, the appropriate temperature gradient allows a potential upper portion of a lens to have well-developed silver halide crystals with a controlled progression to substantial freedom from nucleation at the bottom, or potential bottom, of the lens, or lens blank. This is accomplished by assuring that a leading edge, for example, of a lens is heated above its strain point but below its softening point while the following, or opposite, edge is heated to a lower temperature. After heating, the lenses are allowed to cool sufficiently to avoid thermal fracture in an annealing furnace, or within asbestos blankets, or the like, to prevent thermal fracture. Conventional grinding, polishing, generating, edging, and glazing techniques then are used to prepare and mount lenses in frames. Suitable conventional strengthening techniques, pursuant to commercial practices, are used to satisfy Government regulations.

Table II

Prior Art Examples of Silver Halide-Containing Glasses Requiring Heat Treatment to Produce Photochromic or Phototropic Behavior

| Base Glass System (major ingredients) | Source |
|---|---|
| Silicate | U.S. Pat. 3,208,860 |
| Alumino-Boro-Silicate | 3,197,296 |
| Boro-Alumina-Alkaline Earth | 3,548,060 |
| Boro-Silica-Potassia | 3,594,198 |
| Borate | 3,617,316 |
| Lanthanum-Borate | 3,703,388 |
| Lanthanum-Alumina-Boro-Silicate | 3,765,913 |
| Alumina-Boro-Silicate | 3,795,523 |
| Alumina-Potassia-Boro-Silicate | 3,833,511 |
| Lead-Zinc-Alumina-Borate | 3,834,912 |
| Alumina-Boro-Phosphate | Brit. Pat. 1,275,019 |
| Alumina-Phospho-Silicate | "Reactolite" Analysis |

The glasses of these references may be used to practice our invention.

DETAILED DESCRIPTION OF THE DRAWINGS

In FIG. 1 there is shown a suitable refractory insulating support structure 10 for a laboratory furnace used to practice the present invention. Mounted or supported on an upper surface 11 is an elongate arcuate furnace shell 12. The rear end 13 of the shell is closed by brick 20 to form an open ended box. The opposite end 14 is selectively closed with a refractory shield 15. Supported within the grooves 16 are electrical heating elements (not shown to maintain drawing simplicity). The heating elements which we used are Heavy Duty Electric Co. type 808-104, 850 watts. Over the top of the furnace shell are a series of refractory insulating brick. In the laboratory furnace the bricks are conventional nine inch straights, two of which have an arcuate opening cut through one long edge. The bricks we used were to provide the gradient, we cut different diameter ones in otherwise identical brick. Thus, the first brick 20 fits snugly against the outer or back surface of the member 12 to close it. The second brick 21 has an arcuate cut 22 and the third brick 23 had a yet deeper arcuate cut 24. Thus, the bricks 21 and 23 are spaced different distances from shell 12. The distance progressively increases in size allowing variable flows of air and thus greater cooling through convection and radiation. In this manner we allow for the progressive variation in temperature. Of course, a much finer or more greater temperature variation could be accomplished by using thinner refractory brick with a slower stepwise progression of air space. This technique is well known to those in the refractory and ceramic art. It, in fact, utilizes many of the conventional techniques used in fabricating and operating tunnel kilns. In fact, the tunnel kiln is the preferred commercial method of practicing the present invention wherein a suitable conveyor enters one end of a kiln with untreated lenses while finished lenses are continuously removed from the opposite end. The lens travel is normal to the temperature gradient.

For example, a kiln or lehr useful for large scale production of lens blanks and lenses according to the invention. A belt with speed V is related to the length l of the furnace zone in which the temperature gradient exists by the approximate formula $v = l/90$ [m/min]. This belt speed will vary depending upon the desired gradation of the photochromic behavior and the type of raw glass used.

Referring again to FIG. 1, a lens 30 is supported on a brick of refractory 31 which serves as a lens support. The drawing is substantially to scale and thus the following dimensions will allow one skilled in the art to reproduce our laboratory furnace with ease.

The following is a parts lists for the furnace shown in FIG. 1 that we constructed and used in conducting the work repeated in Examples 1-4 above.

Table III

1) Heavy Duty Heater  Type 808-104  850 watts  115 volts
   6" long hemp. R = 3¼"O.D. R = 2 1/2" I.D. (3/4" rib)
   Heavy Duty Electric, Div. of Sola Basic Industries,
   Hubbard St., Chicago, IL
2) Furnace Floor and Heater Support
   Kaylo (Pink) K-20 Block 2 pcs. 15" long × 9 1/2" wide × 1" thick
   Owen-Corning Fiber Glass 4 pcs. 2 1/4 × 2 1/4 × 1" for legs (nailed)
3) Insulating Firebrick  3 pcs. JM-23 (2 1/2" straights)
                         9" × 4 1/2" × 2 1/2"
                         one as-is for rear wall
   Johns-Manville        one shaped to fit heater snugly
                         one shaped with 3/4" longer radius than above (furnace protrudes 1")
4) Block Carrier one piece 4 1/2" long × 2 3/4" wide × 3/4" thick
   (Firebrick, type JM-30)
5) AO Std Fusing Block Chromite (brown block with wire and +6.00D R.)
6) Heat Radiator St. S 1/16" thick. Channel Beam
   Shape 7" × 7" × 2 1/2"
   Thermo-Couple hole 5/32"
   at ct and 2 1/4" from furnace floor
7) Variac. 10 AMP 1.4 KVA
8) Type 'K' Shielded Thermocouple etc. Recorder, AZAR
   Desirable:  Programmable Temp. Controller, tongs, asbestos gloves, annealing oven, Colmoscope, flash lamp. U.V.

The base supporting structure 10 is 15 inches long 9 inches wide and 4 inches above a supporting table. The legs are 2¼ inches × 2¼ inches × 1 inch slices of brick and the thickness of structure 10 is 2 inches. The refractory insulating brick are of standard dimension i.e. 9 inches × 4 inches × 2½ inches. The arcuate shell 12 is 6 inches long and extends 1 inch beyond the brick 23. The radius of the inside of the exposed face of a strut forming the channels in which the heating elements are located is 2¼ inches. The radius of the curvature of the outside of the shell is 3½ inches and the radius of the arcuate cut in the forward brick 24 is 3½ inches. The shield 15 is a piece of angle iron 7 inches high having rearwardly extending legs 2½ inches in length.

Broadly speaking, an article fabricated according to the present invention is a lens or lens blank exhibiting regressive variation in photochromic behavior from top to bottom as the lens appears in a frame. Distributed throughout the oxide glass body from which the lens or blank is fabricated are silver halide particles constituting at least 0.005 vol. % thereof. The siler halide is selected from the group consisting of silver chloride, silver bromide, and silver iodide. The silver halide particles in the finished lens are of such a size distribution that in at least one portion of the article the linear dimension of said particles is smaller than 5 nanometers (nm) and in remaining portion of the article in a range between 5 and 50 nm. Thus, at the top, or through that portion generally referred to as the "distance portion" the particles are relatively large whereas towards the lower or reading portion of the lens the particles are progressively much smaller to about 5 nm at the bottom.

As elsewhere mentioned above, FIG. 2 is a diagram of the temperature profile actually established in the furnace in fabrication of the lenses described in Examples 1 through 4. FIG. 3A is a schematic diagram of a clear lens having the unnucleated characteristics described above prior to treatment in the furnace of FIG. 1. FIG. 3B is such a lens after treatment.

The preferred and best mode of practicing our invention presently known to us is Example 1 above, using glass A of Table I in the furnace of FIG. 1 and using the temperature profile of FIG. 2.

In the foregoing discussion we have mentioned variation in the linear dimensions of the silver halide particles. It should be understood that when we are discussing the particles being smaller than about 5 nm and substantially progressively increased in size to about 50 nm we are describing an average particle. When we say "average" we mean a substantial preponderance of the particles have the specific linear dimensions. Of course, some particles will be smaller and some larger in any given area because of the lack of precise control over the chemical reaction which results in the particle formation. While we described siler chloride, silver bromide, and silver iodide there can also be mixtures thereof. Broadly, the invention consists of providing for local variation in phototropic or photochromic behavior from one edge to an area spaced therefrom. For example, from a very low transmissivity condition adjacent from a top edge of a lens when it is mounted on a frame to, in a case of a Bifocal lens, very high transmissivity in the reading portion which is adjacent at the bottom edges of a lens when it is in a frame.

Having thus described our invention in detail and with sufficient particularity as to enable one skilled in the art to practice the invention what is desired to have protected by Letters Patent is set forth in the following claims.

This invention is concerned with a method of making ophthalmic quality lenses, or lens blanks, which exhibit a reversible, progressive, local variation in photochromic behavior. Such a lens, as shown in FIGS. 1 and 3B, includes a first portion 110 which will ultimately serve as a distance portion when it is glazed in a frame and another portion 111 which will serve as the near, or reading portion, when glazed. The reversible, progressive, local variation in photochromic behavior is characterized by more resistance to light near the top 112.

This resistance to light transmission progressively lessens to the least resistance to light transmission near the bottom 113. This resistance to light transmission changes substantially uniformly laterally of the lens.

We claim:

1. In a method of making ophthalmic quality lenses, or lens blanks, having a reversible, progressive, local variation in phototropic, or photochromic, behavior, said lens or lens blank including a portion ultimately to serve as a distance portion and another portion ultimately to serve as a near portion, the distance portion and near portion being contiguous with the near portion being below the distance portion when the lens is glazed in a frame, the reversible, progressive, local variation in phototropic or photochromic behavior being substantially more resistant to light transmission near the top which defines the upper limit of the distance portion thereof and substantially less resistant to light transmission in the near portion when said lens is glazed in a frame, the transition in light transmission from the top of the lens to the bottom being substantially uniform laterally of said lens when glazed, comprised of an unnucleated oxide glass lens or lens blank, exhibiting no photochromic properties to the eye before nucleation, and being made of glass consisting of ophthalmic quality glass, said lens, or lens blank, containing through its volume at least 0.005 volume percent of at least one silver halide selected from the group consisting of silver chloride, silver bromide, silver iodide and mixtures thereof, after nucleation in at least that portion of the lens, or lens blank, showing phototropic or photochromic behavior, said halide being in the form of particles, there being a progressive variation in the average linear dimension of said particles substantially corresponding to the variation in phototropic or photochromic behavior of the lens, or lens blank, the average linear dimensions of said silver halide particles being smaller than about 5 nanometers in the near portion and said particles substantially, progressively, increasing in size to about 50 nanometers in the distance portion, the improvement comprising the steps of forming a lens, or lens blank, from a glass making batch, said lens, or lens blank, containing throughout its volume at least 0.005 vol. % of at least one silver halide selected from the group consisting of silver chloride, silver bromide, silver iodide, and mixtures thereof, subjecting said glass lens, or lens blank, to a heat treatment, said heat treatment consisting of subjecting the distance portion of such a lens, or lens blank, to a temperature above the strain point but below the softening point thereof for a time period sufficient to grow silver halide particles having an average linear dimension of about 50 nm, substantially progressively lessening the temperature of heat treatment across said lens from the top edge which defines the upper limit of the distance portion to that area spaced therefrom which constitutes the near portion in such a manner as to form silver halide particles of progressively smaller average linear dimension to thereby produce a lens characterized by a local variation in phototropic or photochromic behavior the greatest photochromic or phototropic behavior being exhibited in the distance portion.

2. The method of claim 1 in which the glass lens is made from a batch having the following oxide analysis:

$SiO_2$:53.0
$Al_2O_3$:10.5
$ZrO_2$:2.0
$Li_2O$:2.1
$BaO$:6.0
$SrO$:0.2
$Na_2O$:0.6
$NaF$:1.0
$NaCl$:1.0
$Ag_2O$:0.4
$PbO$:5.1
$CuO$:0.1
$P_2O_5$:0.0
$B_2O_3$:18.0
$K_2O$:0.0
$NaBr$:0.0
$MgO$:0.0

3. The lens of claim 2 in which the heat treatment is characterized by a curve substantially identical to that shown in FIG. 2.

4. The process of claim 3 in which the temperature at said near portion does not exceed the strain point of the glass.

5. A process according to claim 1 in which lens consists of a glass matrix selected from the group consisting of silicate, boro-silicate, phospho-silicate.

* * * * *